Patented July 26, 1938

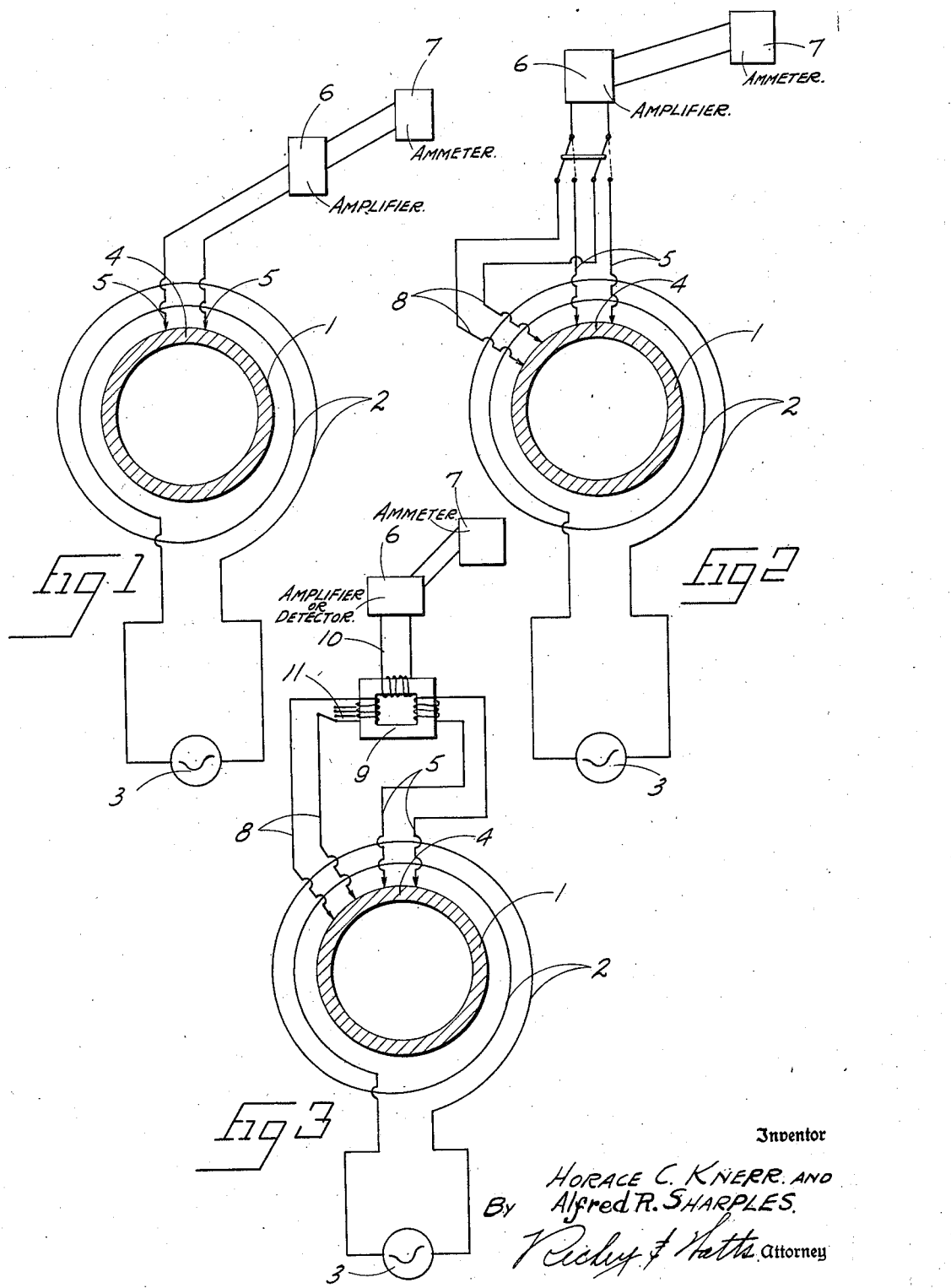

2,124,578

UNITED STATES PATENT OFFICE 2,124,578

APPARATUS AND METHOD FOR TESTING METAL ARTICLES

Horace C. Knerr, Philadelphia, and Alfred R. Sharples, Drexel Hill, Pa., assignors, by direct and mesne assignments, to Steel & Tubes, Inc., Cleveland, Ohio, a corporation of Ohio Application August 6, 1932, Serial No. 627,798

4 Claims. (Cl. 175—183)

This invention relates to a method of and apparatus for testing electrically conductive articles for defects. More particularly this invention relates to testing of articles composed of metals which may be in any of a variety of shapes such as for example tubes, bars, rods and structural shapes of short or long axial lengths. This invention is disclosed and claimed broadly in the application of Horace C. Knerr, Serial No. 589,887, filed January 7, 1932.

This invention is particularly suited to the detection of defects of appreciable axial lengths in metal articles of the foregoing descriptions, for example, such defects as are of the order of about $\frac{1}{16}$" or more in axial length. This method is capable of detecting defects of such magnitude when the defects are in the form of cracks, crevices, pits, inclusions of slag or other foreign material and imperfectly welded seams of tubes.

It is important in many uses of articles of the foregoing description that defects of the order referred to herein should be detected before much time or labor has been expended thereon or before they are put into use. The present invention makes possible the detection of the foregoing defects before the articles are completely machined or put into use and hence is potentially capable of resulting in considerable savings in manufacturing costs and also in preventing use of defect-containing articles where failure of the article in use might be serious. In other words, a defect-containing article may be rejected before much time or labor has been expended on it and certainly before it is put into service where it might fail because of the defect.

The present invention is based fundamentally on the fact that defects of the foregoing character in metal articles vary the reactions of the article on currents flowing therein and that if the general location of possible defects in an article is known the exact location of the defects may be detected and the fact of whether or not the defects are greater than the maximum permissible size, may be determined.

These determinations may be made independently of the magnetic character of the materials of which the articles are composed.

According to this invention energizing current is employed to create a flow of exciting current circumferentially in the article and the reactions on this exciting current caused by the article are noted.

In the drawing accompanying and forming a part of this specification,

Fig. 1 shows diagrammatically a simple form of apparatus embodying the present invention;

Fig. 2 shows a modified form of apparatus embodying the invention; and,

Fig. 3 shows diagrammatically a modification of the apparatus shown in Fig. 2.

A suitable mode of carrying out this invention is to cause energizing current to flow in a coil around the article, thereby creating a magnetic field in the vicinity of the coil and inducing a flow of exciting current in the article. The current so induced in the article will be localized by the construction and arrangement of the coil, and the particular distribution of the electrical current in the article will be determined largely by its shape and the variations in size, nature and condition of the material making up the article. Given a homogeneous metal article symmetrical about the axis of the magnetic field, the current will flow circumferentially in the article.

The presence of an irregularity, such as an imperfectly welded seam, extending lengthwise of the article and located within the path of the exciting current, will locally vary the reaction of the article on the exciting current. According to this invention this local variation is employed by suitable apparatus, to indicate the presence and the location of the irregularity.

When the article within the uniform magnetic field is homogeneous and of uniform resistance throughout, the electromotive force induced in it is balanced by the potential drop of the induced current throughout all portions of the article in which the current is flowing. Such a condition is inherent in the nature of such induced current. Accordingly, no potential difference between various parts of the article within the magnetic field are detectable. When an irregularity or imperfection is present in the article within the exciting current, the resistance to current flow at that point differs from the resistance to current flow at all adjacent normal parts of the metal, that is, parts free from objectionable irregularities. As is well known, the potential drop is directly proportional to the electrical resistance, and, accordingly, the potential drop across such imperfection or irregularity will be increased in proportion to the increase in electrical resistance at that point due to the presence of the imperfection. However, the electromotive force induced in the article at that point will be substantially unchanged. Therefore, at the location of the imperfection, the potential drop caused by the flow of electrical current will differ from the induced electromotive force by an amount which is in proportion to the change in electrical resistance at that point.

Thus it is seen that a method of determining the presence and the location of the imperfection in the material of the article under test is afforded. By providing the means for detecting and responding to the presence of potential difference and by applying such a means to the material under test, the detection of such potential difference will indicate the presence, the location and, to some degree, the magnitude of the imperfection. Suitable apparatus for effecting such a test or measurement is disclosed in the accompanying drawing.

In the drawing the article to be tested takes the form of the tube 1, which may have been formed by shaping flat stock into tubular form and welding along a longitudinal seam. The tube is disposed within the coil 2, diagrammatically illustrated which is supplied with alternating or pulsating current from any suitable source 3. A suitable structural form of the coil is disclosed in the before mentioned copending application, wherein the coil is fixed and the tube is movable axially along a fixed axis which preferably coincides with the axis of the coil. The imperfection may be present in the form of an incomplete weld 4 in the article 1. In order to detect the presence of the imperfection 4 suitable contacts, which may take the form of electrical contacts carried in a suitable manner and brought into contact with the article at points spaced apart on opposite sides of the seam, as the contacts indicated diagrammatically at 5, are caused to move in a longitudinal direction relative to the tube, or vice versa. The presence of any local irregularities in the metal of the tube will cause variations in potential difference between the contacts, which variations may be suitably amplified, and, if desired, may be indicated or recorded by any suitable apparatus. The contacts 5 may be connected to any suitable detecting device of high sensitivity, such as a thermionic tube. A difference in potential between the contacts 5 will set up a difference of potential between the elements of the thermionic tube, thus causing a change in the electron flow in the tube which may be further amplified by suitable means such as transformers or other well known means. The output from the plate circuit of the tube may be employed to give the indication through any suitable form of electrical measuring instrument, such as an ammeter. The amplifier and an ammeter are indicated diagrammatically at 6 and 7. As pointed out hereinbefore, the magnitude of the excess potential drop over the induced electromotive force incurred by the presence of the imperfection will be in proportion to the size of and will vary with the electrical nature of the imperfection. Thus the indication given by the ammeter or like instrument may to some degree indicate the size of the imperfection and/or its nature. Electrical transients due to variations in contact resistance may be eliminated or averaged out by use of the proper type of voltage operated amplifying currents.

Thus a method and an apparatus for detecting the presence and location of imperfections in articles being tested has been provided which makes use of differential electrical effects which are not vitiated by changes in the absolute magnitudes of the variables attendant upon such a method and apparatus. While the method of this invention is substantially free of vitiating errors, still another form of the invention is available in which a comparison may be made between a part of the article under test which is free from imperfections and another part of the article in the same transverse plane which may have such an imperfection.

As shown in Fig. 2, an auxiliary set of contacts 8 are provided which are located in the same transverse plane but on a different part of the article than that on which the contacts 5 are located. Thus the potential drop, if any, between contacts 5 may be compared with that between contacts 8, if any. The effect of any stray flux will be substantially the same on both pairs of contacts. Suitable means may be provided for alternatively connecting an amplifying and indicating system with either of the pair of contacts 5 or 8. Alternately, an amplifier and indicator may be associated with each of the pairs of contacts for continuous comparative indication.

In Fig. 3 is shown a variation of the apparatus of Fig. 2. The pairs of contacts 8 and 5 respectively constitute parts of opposed primary windings of transformer 9, the secondary winding 10 being connected to an amplifier or detector 6. The latter may, if desired, be connected to an ammeter or other indicating apparatus 7, as is shown in Figs. 1 and 2. The primary transformer winding in which contacts 8 are included, is shown provided with means 11 capable of adjustment so that the current flowing in the two primary circuits of the transformer may be substantially balanced, in which condition substantially no current will flow in the secondary circuit 10. When an irregularity is located between contacts 5, the current flowing in these two primary circuits will differ, or the previous balanced condition will be upset and as a result current will flow in the secondary circuit 10 and be detectable by devices 6 or 7.

The device of Fig. 3 in thus another and automatic means for eliminating imperfections of the magnetic circuit, including the elimination of the effect of stray flux. As indicated in the drawing, the detector circuits are disposed on the outside of the article so that they or the parts thereof adjacent to the article are fixed with respect to the fixed coil and to the article.

While the foregoing description has been made on the basis of relative axial movement of the article being tested and the contacts 5, it will be obvious to those skilled in the art that this invention may also be carried out when the article and the contacts are relatively rotated or moved around each other. When the parts are so moved, the present invention is capable of exploring an article thruout substantially all portions in any transverse plane. Longitudinally extending irregularities in any given transverse plane may thus be detected with the same facility as when the article is being explored longitudinally for such irregularity.

While certain forms of the invention have been described in detail by way of illustration, it is not intended so to limit the invention inasmuch as variations in the manner of executing the process and the construction and arrangement of the parts of the apparatus may be made without departing from the spirit and scope of the invention as defined in the following claims.

What we claim is:—

1. Apparatus for electrically testing electrically conductive articles which includes a coil having its axis located in a fixed position and being adapted to carry alternating current, said coil being so mounted that relative axial movement may take place between said coil and an electrically conductive article which is long axially as compared with the axial length of said coil, is disposed on the fixed axis of said coil and is in inductive relation to the coil, the alternating current flowing in said coil serving to induce a flow of current circumferentially in the portion of the article within said coil, a detector circuit having a pair of contacts fixed in position relative to the coil and engaging the exterior surface of the article at circumferentially spaced points within the magnetic field created by current flowing in said coil, and electrical means operatively associated with the detector circuit for indicating variations in current flowing therein and thereby locating the presence and position of defects.

2. Apparatus for testing electrically conductive articles which includes a coil having its axis located in a fixed position and being adapted to carry alternating current, said coil being so mounted that relative axial movement may take place between said coil and an electrically conductive article which is long axially as compared with the axial length of said coil, is disposed on the fixed axis of said coil and is in inductive relation to the coil, the alternating current flowing in said coil serving to induce a flow of current circumferentially in the portion of the article within said coil, detector circuits, each having a pair of contacts fixed in position relative to the coil and engaging the exterior surface of the article at circumferentially spaced points within the magnetic field created by current flowing in said coil, and electrical means operatively associated with the detector circuits for indicating variations in current flowing in the article between the contacts of each pair of contacts and thereby locating the presence and position of defects.

3. Apparatus for electrically testing electrically conductive articles which includes a coil having its axis located in a fixed position and being adapted to carry alternating current, said coil being so mounted that relative axial movement may take place between said coil and an electrically conductive article which is long axially as compared with the axial length of said coil, is disposed on the fixed axis of said coil and is in inductive relation to said coil, the alternating current flowing in said coil serving to induce a flow of current circumferentially in the portion of the article within said coil, two detector circuits adapted to carry current induced by the current flowing in said coil, each circuit having a pair of contacts fixed in position relative to the coil and engaging the exterior surface of the article at circumferentially spaced points, and means including a transformer having portions of said circuits as primary windings in opposed relation and having a secondary winding associated with an electrical indicator to indicate a condition of unbalance of current flowing in said primary windings thereby to locate the presence and position of defects.

4. The method of testing electrically conductive articles for defects which includes the steps of creating an alternating magnetic field and inducing a flow of current circumferentially in an axially short portion of an elongated electrically conductive article, causing relative axial movement of the article and field, bringing into physical contact with the exterior of the article contactors of electrical means to detect variations in the flow of induced current in the article, and determining the presence and position of defects in the article by indicating variations in current flow detected by said electrical means.

HORACE C. KNERR.
ALFRED R. SHARPLES.